March 8, 1966  R. W. SCHWEITZER  3,239,760
TRANSISTOR SOCKET HAVING TWO UNIAXIALLY ALIGNED AND ELECTRICALLY
ISOLATED CONTACTING TERMINALS FOR EACH INSERTED LEAD
Filed Jan. 8, 1962
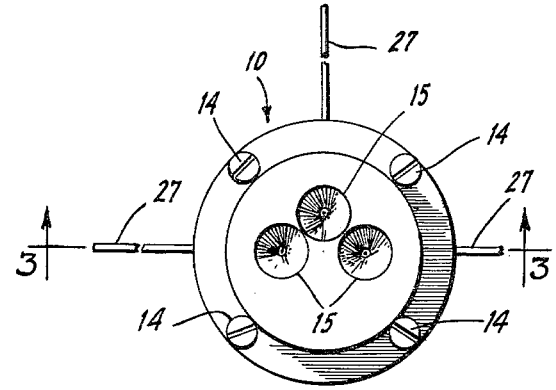
FIG. 2.
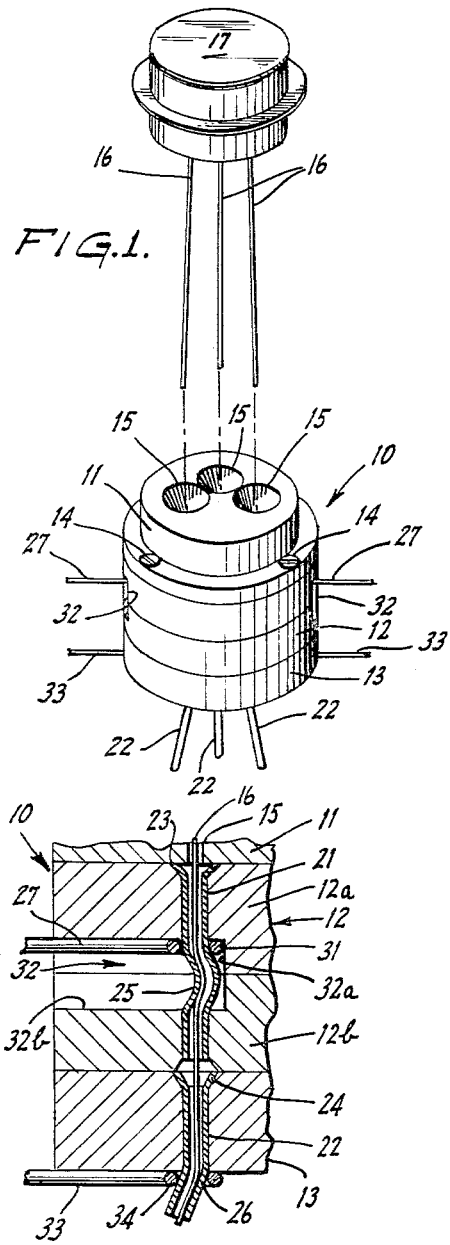
FIG. 1.
FIG. 4.
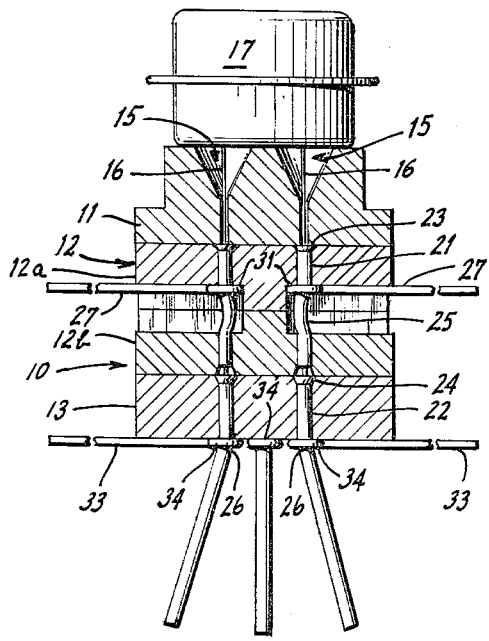
FIG. 3.
INVENTOR.
ROBERT W. SCHWEITZER
BY
Harry W. Hargis III
AGENT

United States Patent Office 3,239,760
Patented Mar. 8, 1966

3,239,760
TRANSISTOR SOCKET HAVING TWO UNIAXIALLY ALIGNED AND ELECTRICALLY ISOLATED CONTACTING TERMINALS FOR EACH INSERTED LEAD
Robert W. Schweitzer, Doylestown, Pa., assignor to Philco Corporation, Philadelphia, Pa., a corporation of Delaware.
Filed Jan. 8, 1962, Ser. No. 164,753
2 Claims. (Cl. 324—158)

This invention relates to electrical test apparatus, and more particularly to an electrical socket having especial test utility. While of broader applicability, the socket is especially adapted for the mounting of, and establishing electrical test connections to, transistor devices of the type comprising a protective, hermetically sealed envelope from which extend a plurality of relatively long slender lead wires.

In the testing of transistors it is a practice to apply a high frequency electrical signal to the leads and to take various pertinent electrical measurements by suitable instruments placed in the circuitry. In order accurately to determine the high frequency characteristics of a transistor it has been found desirable to trim away portions of the lead wires. Also, it has been desirable to trim the lead wires in order to facilitate their axial insertion into a test socket. Trimming of the wires is not only a time consuming operation, but also renders the transistor unusable for certain applications.

It is therefore a broad objective of this invention to provide novel and improved electrical test apparatus.

It is a specific objective of the invention to provide a novel electrical test socket which advantageously eliminates the need for lead wire trimming while providing for rapid and accurate testing of a transistor.

In the achievement of the foregoing objects and advantages the invention comprises electrical test apparatus including a socket having an electrically insulative base provided with a plurality of axially extending lead-wire receiving apertures. A pair of separate and distinct electrical contact means is associated with each of the apertures and adapted to engage axially spaced portions of an inserted lead wire. The invention is characterized in that each of the contacts comprises a tubular, electrically conductive element having laterally displaced curved portions disposed and adapted to ensure a low resistance electrical path between an axially inserted lead wire and the contact.

The invention is further characterized in that one set of test socket contacts engages the lead wires in regions closer to the component undergoing test than do the other socket contacts. This arrangement is advantageous in that operating potentials may be applied at the more remote contacts and both a high frequency signal may be introduced and performance-indicative readings may be made at the closer contacts.

The foregoing as well as additional objects and advantages of the invention will best be understood from a consideration of the following description, taken in light of the accompanying drawing in which:

FIGURE 1 is a perspective showing of a preferred form of test socket embodying the invention and including a transistor device aligned with the socket just prior to axial insertion into the latter for testing;

FIGURE 2 is a plan view of the test socket shown in FIGURE 1;

FIGURE 3 is a sectional view, in elevation and taken along the line 3—3 applied to FIGURE 2, and with a transistor inserted in the socket for test purposes; and FIGURE 4 is an enlarged fragmentary view of the socket illustrated in FIGURE 3.

With more particular reference to FIGURES 1, 2 and 3 of the drawing, a socket 10 comprises an upper section 11, an intermediate section 12 made up of a pair of elements 12a and 12b, and a lower section 13. Sections 11, 12, and 13 are made of an electrically non-conductive material, such for example as polytetrafluoroethylene, and held together in axial alignment by screws 14. The socket has axially extending apertures 15 within which lead wires 16 of a transistor 17 may be axially received, as shown in FIGURE 3. Each of apertures 15 is lined with a pair of electrically conductive, metal tubes, preferably but not necessarily of stainless steel, comprising an upper tube 21 and a lower tube 22, each having a bore of greater diameter than a lead wire 16. The upper ends of tubes 21 are flared, as seen at 23, as are the apertures 15 in the same region. The upper ends of the lower tubes 22 also are flared as seen at 24, in the region of the interface between socket sections 12 and 13.

Upper tubes 21 include laterally bent loop portions 25, and lower tubes 22 are slightly bent in the region indicated generally by the numeral 26, whereby the lower ends of tubes 22 are divergent from the axis of the socket. As best seen in FIGURE 4, the respective looped and bent portions 25 and 26 advantageously ensure low resistance electrical contact of the leads 16 with the tubes 21 and 22 which form the metal contacts of the socket.

Electrical terminal means for contact tubes 21 comprise lead wires 27 which are looped about tubes 21 and soldered thereto, as seen at 31. Lead wires 27 extend radially out of the insulative base through the slots 32 formed by complementary grooves 31a and 31b formed in elements 12a and 12b, respectively.

Electrical terminal means for each of contact tubes 22 comprises a lead wire 33 which is looped about and soldered to each of tubes 22, which connections are shown at 34. Lead wires 33 also extend radially from the axis of the insulative base. The radial dispositions of socket lead wires 27 and 33 minimize capacitance effects of high frequency signals applied to and sensed at the terminals 22 and 21, respectively.

With particular reference to the somewhat enlarged showing of FIGURE 4, it is seen that bent portions 25 and 26 of the tubular terminals enhance electrical contact of the socket with the axially inserted flexible, slender rod-like lead wires. Also, it will be understood that flared portions 23 and 24 of the wire receiving electrical contact tubes allow for slight deviations of the lead wires 16 from normal positions corresponding either to the exact centers of apertures 15 or to the locations at which the lead wires extend from the transistor.

Advantages achieved by the test socket of this invention become apparent when considering that the operating potentials are applied to a transistor undergoing test through the lower contact tubes 22 and both performance readings are taken and high frequency signals are introduced at separate and distinct upper contact tubes 21. Contact tubes 21 by being positioned as close to the transistor as is physically possible minimize the inductance effects of the lead wires when determining high frequency performance characteristics of the transistor. Heretofore in order to minimize the inductance effects it frequently had been necessary to trim the lead wires.

Also, excellence of electrical contact with the lead wires is achieved by bending of the contact tubes. This feature of construction imparts a combined frictional and bending force upon the wire as it is inserted axially of said tube, tending both to clean the contacting regions and providing a uniform pressure contact.

From the foregoing description it can be appreciated that the invention provides a novel electrical test socket which advantageously eliminates the need for lead wire trimming while providing for rapid and accurate testing of transistor devices inserted therein.

While the invention has been shown in but one form, it will be obvious to those skilled in the art that it is susceptible of various modifications as contemplated by the scope of the appended claims.

I claim:

1. A test socket for an electrical component having flexible lead wires extending therefrom, said socket comprising: an insulative base having electrically conductive lead-wire receiving contact means, each said contact means including a pair of generally tubular elements providing electrical engagement with axially spaced portions of each inserted lead wire, each said tubular element including flared end portions so presented as to facilitate axial insertion of a lead wire, each said tubular element further having at least one laterally curved portion so shaped and disposed as to frictionally engage and to guide a lead wire as it is inserted axially of the tubular element whereby to ensure electrical connection between each element and an inserted lead wire; and terminal means for each of said tubular elements through one of which a suitable electrical signal may be applied to one of said tubular elements and through the other of which the operating characteristics of an inserted electrical component may be read, each said terminal means being disposed in electrically conductive engagement with the outer portion of a corresponding one of said pair of tubular elements in the region of one of said laterally curved portions.

2. High frequency electrical testing apparatus for a transistor device having elongate, relatively slender, and flexible lead wires extending therefrom, said apparatus comprising: a test socket including an electrically insulative base having elongated lead-wire receiving apertures; a pair of tubular, substantially axially aligned metallic contact means disposed in end-to-end relation within each said aperture and spaced one from the other along their common axis, each said contact means including flared end portions presented to accommodate axial insertion of a lead wire into the bore of the tubular contact means and off-set curved portions disposed and adapted frictionally to engage and to flex a lead wire as it is axially inserted within the bore of said contact means in establishment of electrical connection between said lead wire and the interior of each said contact means; and a pair of unidirectionally extending terminal members each disposed in electrically conductive engagement with the outer periphery of a corresponding one of said pair of contact means in the region of the off-set curved portions, one of said terminal members providing for application of a high frequency electrical signal to the corresponding lead of such transistor device and for determination of its electrical operating characteristics, and the other of said terminal members providing for application of an operating potential to the device.

References Cited by the Examiner

UNITED STATES PATENTS

| | | | |
|---|---|---|---|
| 1,630,936 | 5/1927 | Godley | 329—22 X |
| 2,865,003 | 12/1958 | Harmon | 324—158 |
| 2,922,135 | 1/1960 | Hoberg et al. | 317—99 X |
| 3,107,963 | 10/1963 | Hansen. | |

FOREIGN PATENTS 175,522   6/1961   Sweden.

WALTER L. CARLSON, *Primary Examiner.*